United States Patent
Adams, III

[15] 3,685,369
[45] Aug. 22, 1972

[54] STEERING COLUMN
[72] Inventor: Don Adams, III, Ferndale, Mich.
[73] Assignee: Chrysler Corporation, Highland Park, Mich.
[22] Filed: Nov. 15, 1971
[21] Appl. No.: 199,070

Related U.S. Application Data

[63] Continuation of Ser. No. 886,535, Dec. 19, 1969, abandoned.

[52] U.S. Cl. ................................. 74/492, 74/552
[51] Int. Cl. .......................................... B62d 1/18
[58] Field of Search .................. 74/492, 493, 552

[56] References Cited

UNITED STATES PATENTS 3,167,974   2/1965   Wilfert ........................ 74/552
3,434,367   3/1969   Renneker et al. ........... 74/492

*Primary Examiner*—Milton Kaufman
*Attorney*—Harness, Talburtt & Baldwin

[57] ABSTRACT

Steering column having yieldable members at the upper and lower ends thereof adapted to deform independently of one another. The column jacket is of a noncollapsible nature, while the yieldable members are shown in two forms, one being a thin walled hollow cylindrical member having a series of individual annual convolutions therein, and the other being a pair of mating telescoping steering shaft members.

2 Claims, 3 Drawing Figures

PATENTED AUG 22 1972
3,685,369
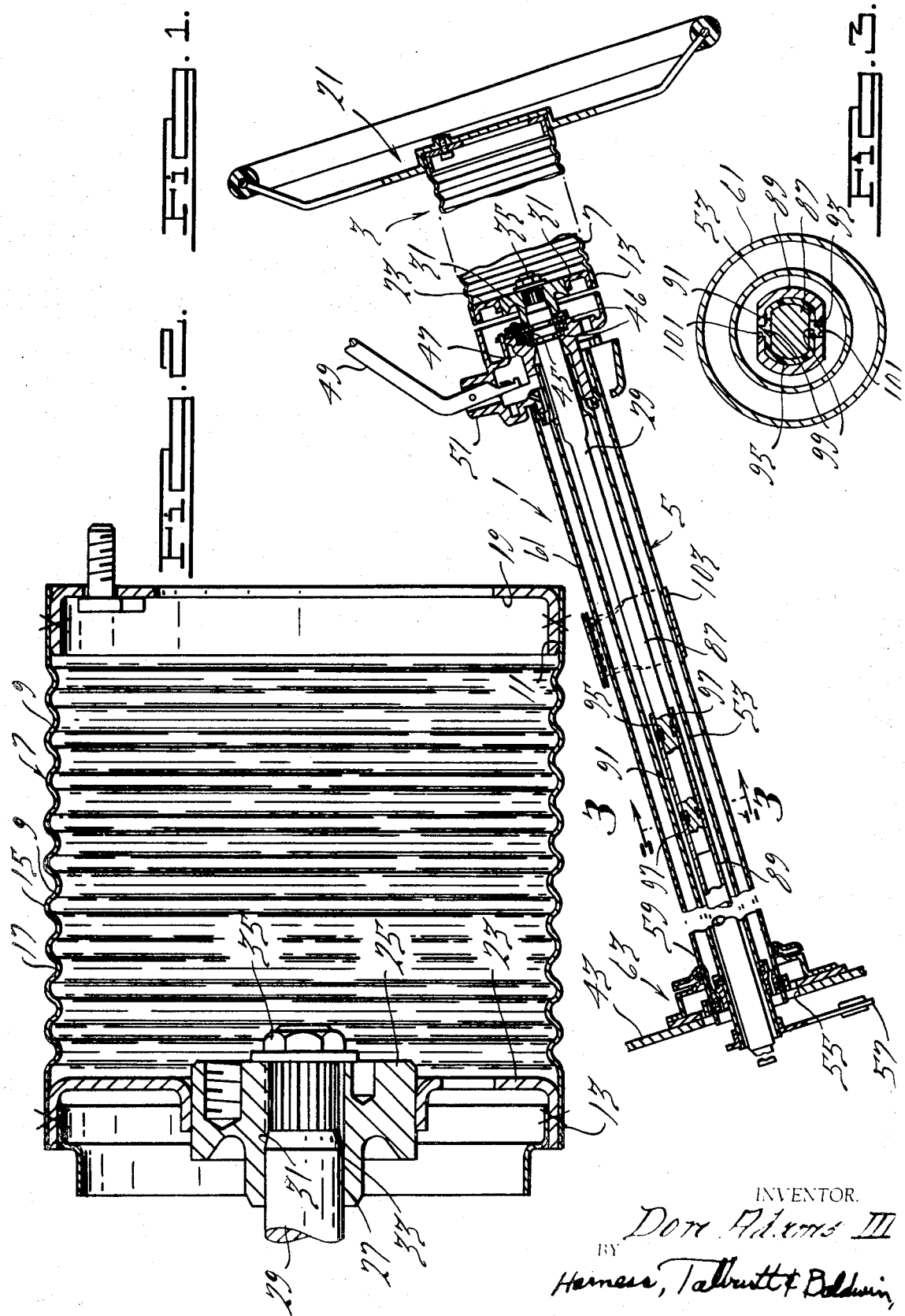
INVENTOR.
Don Adams III
BY
Harness, Talbuitt & Baldwin,
ATTORNEYS

STEERING COLUMN

This is a continuation of application Ser. No. 886,535 filed Dec. 19, 1969, now abandoned.

BACKGROUND OF THE INVENTION

This invention relates to vehicular steering columns, and more particularly to an impact-absorbing steering column.

Steering columns of the type adapted to collapse upon impact at one end or the other have long been known. Some relatively early collapsible steering columns, such as shown in U. S. Pat. No. 2,028,953, for example, issued Jan. 28, 1936, utilized a dash pot concept with oil or other fluid being forced out of a chamber by one end of a steering shaft section upon impact.

More recently, telescoping steering columns, such as shown in U. S. Pat No. 2,836,079, for example, issued May 27, 1958, have been developed, wherein one column member telescopes over another upon impact. Other recent developments include a hollow deformable body attached to the upper end of a steering column and extending upwardly beyond the plane of the steering column and extending upwardly beyond the plane of the steering wheel. Still more recently, steering columns having a length of expanded metal therein adapted to collapse at a controlled rate upon impact have been developed. Another recently developed column is shown in U. S. Pat. No. 3,434,367. This patent discloses a column having a generally cylindrical member at the upper end thereof adapted to collapse when an impact force of a predetermined magnitude is applied to the upper end of the column. The present invention is an improvement on this type of column.

SUMMARY OF THE INVENTION

Briefly, this invention comprises a steering column apparatus having an upper collapsible or yieldable member adjacent the steering wheel, such member being generally cylindrical and having a plurality of convolutions therein, the depth of which vary.

One of the primary objects of the present invention is to provide an improved vehicular steering column which is adapted to collapse at a controlled rate upon impact of the driver with the steering wheel.

Another object of this invention is to provide a steering column of the type described in which fewer parts collapse upon impact of the driver and steering wheel.

A further object of this invention is to provide a steering column such as described in which the impact of the driver and the steering wheel is readily absorbed regardless of the direction of impact between the driver and the wheel.

Still another object of this invention is to provide a steering column of the class described in which a collapsible member is adapted to collapse more readily at one end than the other.

A further object of this invention is to provide a steering column of the type described which is adapted to collapse upon impact at either end thereof.

Another object of this invention is to provide a steering column such as described which is economical in construction and effective in operation.

Other objects will become apparent as the description progresses.

BRIEF DESCRIPTION OF THE DRAWINGS

Referring now to the drawings in which two of various possible embodiments are illustrated, FIG. 1 is a side elevation, partly in section, of one embodiment of a steering column constructed in accordance with this invention;

FIG. 2 is an enlarged fragmentary view of FIG. 1; and

FIG. 3 is an enlarged section taken along line 3—3 of FIG. 1.

Like parts are indicated by corresponding reference characters throughout the several views of the drawings.

DESCRIPTION OF THE PREFERRED EMBODIMENTS

Referring now to the drawings, one embodiment of a steering column constructed in accordance with this invention is illustrated in FIG. 1 at 1. Column 1 is basically formed of an upper impact-absorbing section 3 and a lower portion 5.

Upper section 3 includes a thin walled hollow generally cylindrical member 7 having a series of individual convolutions 9 arranged adjacent one another substantially equally spaced from one another preferably from one annular end margin 11 to the opposite annular end margin 13. Convolutions 9 form a series of annular ridges 15 alternating with a series of annular recesses or valleys 17, described in more detail hereinafter.

The inside surface of upper annular margin 11 is securely connected, as by welding, for example, to an end head 19 adapted to be connected to the steering rim components 21. A lower end head 23 is securely connected to the inside of the lower annular margin 13. End head 23 has a centrally located hub member 25 having a bore 27 therein in which is secured the upper end of a collapsible steering shaft 29, described hereinafter.

The convolutions 9, as set forth previously, preferably extend from one end portion to the other end portion of the cylindrical member 7. The diameters of the ridges 15 are all substantially the same, but the depths of the recesses 17 between ridges 15 are varied. In particular, the depth of the recesses increases from the upper end of the cylindrical member 7 to the lower end of the member. This gradual increase in depth of the recesses is highly significant. It was found that making the recesses 9 at the lower end of the member 7 deeper, caused the member, when a sufficiently large force is applied thereto, to begin collapsing at the lower end. The upper recesses, because they are shallower are stronger and inhibit collapse until after the cylindrical member 7 collapses at the lower end thereof, as described more fully hereinafter. Stating this another way, as will be seen in the drawings, the sides of the ridges 15 form annularly-shaped lever arms. Since the lever arms are longer at the lower end of the cylindrical member 7 a force applied axially to the outer portion of a ridge adjacent the lower end of member 7 will cause a larger bending moment at the bottom of the adjacent recess, because of the long lever arm, than the bending moment which would be applied at the bottom of a recess adjacent the upper end of member 7 if the same force were applied to the adjacent ridge 15. Thus collapse occurs first at the lower end.

Section 5 of column 1 includes the steering shaft 29, the upper end of which is knurled and, as mentioned earlier, extends through the bore 27 in hub 25. Shaft 29 has an annular shoulder 31 seated against a shoulder 33 in end head 23 to prevent movement of end head 23 toward the lower end of shaft 29. A nut 35 may be provided to prevent movement of end head 23 axially away from shaft 29. Shaft 29 extends down through a floor 43 and is rotatably supported at its upper end by a bearing 45 in a bearing housing 47. Suitable retaining means, such as snap rings 46 are provided on opposite sides of bearing 45 to prevent axial movement of the shaft 29 relative to housing 47. A bracket 103 may be provided for securing the jacket 61 to the vehicle at a point spaced from floor 43.

A transmission or gearshift lever 49 extends through a gearshift housing 51 connected to the upper end of a transmission selector torque tube 53. Transmission selector torque tube, or more simply, shift tube 53, surrounds steering shaft 29 and extends downwardly through an opening 55 in floor 43. Tube 53 has a shift tube lever 57 attached to the lower end thereof below floor 43 adapted to be connected to a transmission operating assembly (not shown). Tube 53 is preferably formed as a one-piece noncollapsible member, the lower end portion of which is rotatably supported by a bearing 59 mounted in the lower end of a tubular steering column jacket 61. If desired, the tube 53 could be formed of a plurality of sections joined together by plastic keys, for example, such as shown in aforementioned U.S. Pat. No. 3,434,367. Jacket 61 is attached to floor 43 by a mounting plate assembly 63 and extends upwardly, around shift tube 53 to housing 51. The upper end of column jacket 61 may be secured to the housing 51.

Shaft 29 is constructed of two pieces 87 and 89. The upper piece 87 is solid and has double flats 91 and 93 on its lower end. It slides down into the hollow lower shaft 89 which has a mating double flatted contour. The mating flats on piece 87 and piece 89 enable the steering shaft 29 to transmit the turning force of the steering wheel to the steering gear.

Injected plastic rings or collars 95 located in grooves 97 of piece 87 have projections 99 extending outwardly through holes 101 in lower tubular piece 89 for staking the pieces 87 and 89 together. The collars take up any clearance between the two mating shafts 87 and 89, and provide a controlled resistance to the telescoping action of the shaft when it is impacted.

Operation of the steering column 1 under impact conditions is as follows:

Assuming first that the front end of the vehicle collides with another object. Initially, the impact tends to move the steering gear (not shown) rearwardly as the vehicle driver's torso begins to move toward the steering wheel. The characteristics of the lower section 7 will be described first.

When the steering gear (not shown) is driven rearwardly by the impact, the force thereof is transmitted through member 65, shaft 29 and snap rings 46 to the housing 47 which is secured to the instrument panel by suitable fastening means (not shown). Normally, during a direct front end collision, the coupling 85 tends to be driven rearwardly and upwardly in a generally axial direction relative to steering shaft 29.

As the steering gear and tubular shaft 89 are driven rearwardly and upwardly by the impact, the plastic projections 99 are sheared along the mating surfaces of shafts 87 and 89, and shaft 89 telescopes over shaft 87. The shaft 87 remains relatively stationary with regard to the instrument panel due to the snap rings 46. Thus, the steering shaft 29 is not driven into the driver area. Naturally, a small amount of energy is absorbed due to the shearing of the plastic projection and friction between members 87 and 89.

As mentioned previously, upon impact, the vehicle driver continues forward toward the steering wheel. If the vehicle driver is wearing a lap belt, the driver's torso may tend to swing toward the steering wheel at the same time the driver's complete body is being thrown forward against the lap belt. As a result, the front of the torso may be generally parallel with the plane of the steering wheel as the torso and wheel meet, and a generally axial impact force may be applied to the wheel. However, as made apparent hereinafter, the direction in which the force is applied by the torso will not prevent yielding of the upper member 7 if the force has a predetermined magnitude.

The force of the torso impact is transmitted through the steering wheel 21, member 7, end head 23, the upper end portion of steering shaft 29 and snap rings 46 to the housing 47. If the impact force is of a predetermined magnitude, the member 7 will begin to collapse in generally accordion fashion, with initial collapse occurring at the lower recesses, because of their greater depth, and then sequentially moving up the member 7, thus absorbing some of the impact. It will be noted that the steering shaft 29, shift tube 53 and column jacket 61 remain relatively stationary and it is unnecessary to accelerate any of these components to absorb the impact.

If the lap belt yields during impact, or if the lap belt is not being utilized by the driver, the drivers torso may approach the steering wheel at an angle other than axially during a collision. For example, the driver's torso might be in a generally vertical position as it makes contact with the steering wheel. In such a case, a bending movement, as well as an axial force, will be applied to the upper impact absorbing member 7, causing the latter to bend as well as deform in an accordion fashion. The member 7 will normally bend first at its lower end due to the greater depth of the recesses therein, i.e., the longer lever arms, assuming a position generally perpendicular to the chest of the occupant and then continue to collapse as the occupant continues to move forward.

It will be seen that a steering column constructed in accordance with this invention is adapted to deform at either end without requiring the column jacket, the shift tube, or the steering shaft to be accelerated by the force applied to the steering wheel, thus substantially reducing the force necessary just to accelerate the mass of the impact absorbing components and thereby permitting nearly all of the impact force to be absorbed by the impact absorbing member. Moreover, the column is adapted to deform upon impact forces above a predetermined value regardless of the direction in which the force is applied to the ends of the column. The graduated depth of the convolutions in the cylindrical member 7 also cause the latter to deform initially at its lower end, and depending upon the direction of impact of the driver against the rim of steering wheel, may deform at the lower end to move the upper end and rim of the steering wheel into planes generally parallel to the driver's chest.

In view of the foregoing it will be seen that the several objects and other advantages of this invention are achieved.

Although only two embodiments of the invention have been disclosed and described, it is apparent that other embodiments and modifications of the invention are possible within the scope of the appended claims.

I claim:

1. An impact absorbing steering column adapted to be connected to a steering gear, said column comprising a steering wheel, yieldable means connected to said steering wheel, said yieldable means including a hollow generally cylindrical member having a relatively thin wall, an upper end head connected to the upper end of said member, a lower end head connected to the lower end of said member, a steering shaft, means connecting said lower end head to said steering shaft, said member having a plurality of annular ridges separated from one another by a plurality of annular recesses, the outer diameter of said ridges being substantially the same throughout the length of said hollow member and substantially the same diameter as the outer diameter of said hollow member at the ends thereof around said end heads, the depths of said recesses varying gradually from one depth adjacent the upper end of said hollow member to a second depth, greater than said first depth, adjacent the lower end of said hollow member, lever arms formed by the sides of said ridges, the lengths of the lever arms being greater at the lower end of said hollow member than at the upper end thereof and gradually diminishing from the lower end to the upper end of said hollow member, a force applied axially to the radially outer portion of a ridge adjacent the lower end of said hollow member creating greater bending moment on the hollow member at the bottom of the recess immediately adjacent and below such ridge than the bending moment which would be applied on said hollow member at the bottom of a recess adjacent the upper end of said hollow member if the same force were applied axially to the radially outer portion of a ridge immediately adjacent and above said recess adjacent the upper end of said hollow member because the length of the lever arm between the ridge adjacent the lower end of said hollow member and the recess immediately adjacent and below such ridge is longer than the length of the lever arm between the recess adjacent the upper end of said hollow member and the ridge immediately adjacent and above such last mentioned recess.

2. An impact absorbing steering column as set forth in claim 1 wherein said means connecting said lower end head to said shaft comprises a hub secured to said steering shaft, said lower end head having an opening therein through which said hub extends.

* * * * *